US012240020B2

(12) United States Patent
Bell (10) Patent No.: US 12,240,020 B2
(45) Date of Patent: Mar. 4, 2025

(54) PIPELINE PIGGING APPARATUS AND METHODS OF USE

(71) Applicant: Brian Bell, Dunmore (CA)

(72) Inventor: Brian Bell, Dunmore (CA)

( * ) Notice: Subject to any disclaimer, the term of this patent is extended or adjusted under 35 U.S.C. 154(b) by 179 days.

(21) Appl. No.: 17/471,350

(22) Filed: Sep. 10, 2021

(65) Prior Publication Data

US 2022/0080473 A1   Mar. 17, 2022

Related U.S. Application Data

(60) Provisional application No. 63/077,061, filed on Sep. 11, 2020.

(51) Int. Cl.
| | |
|---|---|
| *B08B 9/055* | (2006.01) |
| *F16L 55/38* | (2006.01) |
| *F16L 55/40* | (2006.01) |
| *A46B 13/00* | (2006.01) |
| *F16L 101/12* | (2006.01) |

(52) U.S. Cl.
CPC ............ *B08B 9/055* (2013.01); *B08B 9/0557* (2013.01); *F16L 55/38* (2013.01); *F16L 55/40* (2013.01); *A46B 13/001* (2013.01); *A46B 2200/3013* (2013.01); *B08B 9/0553* (2013.01); *B08B 9/0554* (2013.01); *B08B 2209/055* (2013.01); *F16L 2101/12* (2013.01)

(58) Field of Classification Search
CPC ..... B08B 9/055; B08B 9/0553; B08B 9/0554; B08B 9/0557; B08B 2209/055; F16L 55/38; F16L 55/40; F16L 2101/12
See application file for complete search history.

(56) References Cited

U.S. PATENT DOCUMENTS

| | | | | |
|---|---|---|---|---|
| 2,201,680 A | * | 5/1940 | Haynes .................. | B08B 9/0553 166/170 |
| 4,055,315 A | * | 10/1977 | Gvelesiani .............. | F16L 55/38 104/168 |
| 4,891,115 A | * | 1/1990 | Shishkin .................. | F16L 58/02 204/224 R |
| 5,528,790 A | * | 6/1996 | Curran ...................... | F28G 1/08 15/104.061 |
| 2018/0363996 A1 | | 12/2018 | Hooper et al. | |
| 2021/0039144 A1 | * | 2/2021 | Boyd ...................... | F16L 55/26 |

FOREIGN PATENT DOCUMENTS

| | | | | |
|---|---|---|---|---|
| CN | 109396132 A | * | 3/2019 | |
| CN | 109530352 A | * | 3/2019 | |
| DE | 101 51 553 A1 | * | 4/2003 | |
| KR | 10-2014-0037607 | * | 3/2014 | |
| WO | WO 99/67035 | * | 12/1999 | |
| WO | WO 2008/039075 A1 | * | 4/2008 | |

* cited by examiner

*Primary Examiner* — Randall E Chin (74) *Attorney, Agent, or Firm* — Holzer Patel Drennan (57) ABSTRACT

An improved apparatus and methodologies of use for cleaning debris and contaminants from an interior surface or sidewall of a fluid-carrying conduit, such as a pipeline, are provided. More particularly, an apparatus and methodologies of use are provided, wherein the apparatus or 'pipeline pig' operates bi-directionally and comprises counter-rotating cleaning elements that are operative to enhance removal of debris and contaminants from the pipeline.

11 Claims, 11 Drawing Sheets

PIPELINE PIGGING APPARATUS AND METHODS OF USE

CROSS REFERENCE TO RELATED APPLICATION

The present application claims the benefit of priority to U.S. Patent Application No. 63/077,061 filed Sep. 11, 2020, which is specifically incorporated by reference herein for all that it discloses or teaches.

FIELD

Embodiments herein are generally related to apparatus used for cleaning debris from an interior surface or wall of a fluid-carrying conduit, such as a pipeline. More particularly, embodiments herein are related to an improved apparatus, commonly referred to as a 'pipeline pig' and its method of use, wherein the apparatus comprises counter-rotating cleaning blades that are operative to thoroughly remove debris from the pipeline.

BACKGROUND

Over time, contaminants in fluids being transported in fluid-carrying conduits can collect on the inner surface or wall of the conduit, constricting the bore of the conduit and reducing its fluid-carrying capacity. Some fluid-carrying conduits, such as those used in the oil and gas industry, may also experience chemical, mechanical, or electrical reactions within the conduit, creating undesired by-products, reducing the longevity of the conduit, and interfering with equipment used to monitor the conduit.

Apparatus for cleaning debris build-up in fluid-carrying conduits are well known, particularly for use in the oil and gas industry to clean pipelines, tubulars, lines and ducts. Such tools are often referred to as 'pigs', and the conduit cleaning process using a pig is referred to as 'pigging'. Without limitation, pipeline pigs may also be designed for use in hydrostatic testing and pipeline drying, for internal coating, liquid management, batching, and inspection.

Various methods of cleaning fluid-carrying conduits have been developed and typically involve inserting a pig into a conduit at a first point, applying a motive force to the pig, and traversing the pig through the conduit to clean the inner surface or wall of the conduit up to a second point, from which the conduit pig may be retrieved and removed. Conventional pigging componentry includes a device to launch the apparatus into the conduit and a receiver system to retrieve it.

Pigs are normally configured to run approximately hundreds of kms within a conduit and can be constructed from a steel bullet-shaped body with metallic and/or rubber scraping members. For example, pipeline pigs are commonly designed to have a central body for supporting a plurality of abrasive scraping brushes, plates, or bristles that extend outward from the body and contact the interior surface of the conduit wall. As the pig moves through the conduit, the metallic brushes apply a mechanical force to rub off debris collected within the conduit—for instance, by scraping or brushing debris built upon on the interior surface of the conduit.

Other conduit pigs are designed to support one or more fixed (i.e., non-rotating) disks extending outward from the central body. Such pigs are often pressure driven where fluids flowing through the pipeline act on the disks to push the pig the pipe. These disks preferably form a seal with the interior wall of the conduit, amplifying the motive force applied to the pig while pushing the debris downstream of as the pig moves through the conduit.

Although known conduit pigs and methodologies of use can remove some debris from the interior surface of a conduit, their effectiveness is limited. Fixed scraping members and disks often fail to agitate built-up debris with sufficient force to dislodge all debris. Fixed scraping members and disks are also configured to agitate debris from one direction of movement only, such that the conduit pig cannot clean the conduit in reverse or exert lateral force on the debris while the conduit pig moves forwards. This limited effectiveness necessitates more frequent pigging operations and results in an unavoidable buildup of immoveable debris over time, which may interfere with conduit operation. Such limitations are exacerbated by operators looking for more continuous pipeline processing to increase efficiencies and reduce costs.

One known pipeline pig is disclosed in U.S. Patent Publication No. US2018/0363996 A1 (the "996 Application"), the pig having fixed brush bristles arranged secantially relative to the body of the pig, such bristles either being arranged in a clockwise orientation (resulting in rotation of the entire pig as it transits the conduit), or in both a clockwise and counter-clockwise orientation (preventing rotation of the pig). As a result, the fixed-bristle pig disclosed in the '996 Application provides an example of known ineffective pipeline pigs that are only operative in one direction within the conduit and, although they may be configured to be rotatable, such rotation is unilateral and can result in the pig becoming lodged or stuck within the conduit.

There is therefore a need for an improved conduit pig and methods of use.

SUMMARY

According to embodiments, an apparatus for use in cleaning an inner sidewall of a fluid-carrying conduit is provided, the apparatus comprising a tubular shaft, having a first end and a second end, and one or more cleaning elements rotatably mounted onto the shaft, each cleaning element forming a centrally disposed hub having at least one blade extending radially therefrom and frictionally contacting the sidewall of the conduit wherein, as the apparatus traverses through the conduit, the frictional contact between the at least one blade and the sidewall imparts rotation of the one or more cleaning elements about the shaft to clean the sidewall of the conduit.

In some embodiments, rotation of the cleaning elements may be in a clockwise or a counterclockwise direction relative to a longitudinal axis x of the apparatus. In some embodiments, the at least one blade extends perpendicularly from the hub at an angled or pitched orientation from a longitudinal axis x of the apparatus. For example, the at least one blade of a first cleaning element may be angled in a first orientation from the axis x to cause rotation of the cleaning element in a clockwise rotation, and the at least one blade of a second cleaning element may be angled in a second orientation from the axis x to cause rotation of the cleaning element in a counterclockwise direction. In some embodiments, the frictional contact of the one or more blades of the first and second cleaning elements with the sidewall of the conduit causes the first and second cleaning elements to rotate in opposite, counter-rotating directions.

In some embodiments, the apparatus further comprises at least one first and second end disks mounted on the shaft.

The one or more cleaning elements may be positioned along the shaft in between the first and second end disks. In some embodiments, the at least one first end disk is mounted on the first end of the shaft, and the at least one second end disk is mounted on the second end of the shaft. In some embodiments, the first and second end disks have an outer diameter about of approximately greater than the inner diameter of the sidewall of the conduit.

In some embodiments, the apparatus may further comprise any number of brushing elements positioned along the shaft in between the first and second end disks and/or the one or more cleaning elements.

In some embodiments, the apparatus may further comprise any number of spacing elements positioned along the shaft in between the first and second end disks, the one or more cleaning elements, and/or the any number of brushing elements.

According to embodiments, methods of cleaning an inner sidewall of a fluid-carrying conduit are provided, the methods comprising providing an apparatus for cleaning the sidewall into the conduit, wherein the apparatus has a tubular shaft, having a first end and a second end and one or more cleaning elements rotatably mounted on the shaft, each cleaning element having at least one blade extending radially therefrom for frictionally contacting the sidewall of the conduit. The apparatus is positioned or 'launched' within the conduit at a first position where fluid pressures generated by fluids flowing through the conduit can impart an axial force on the apparatus causing it to move to a second position within the conduit, wherein movement of the apparatus causes the one or more cleaning elements to frictionally engaged with the sidewall and rotate about the shaft and clean the sidewall.

In some embodiments, the one or more cleaning elements rotate in a clockwise or a counterclockwise direction relative to a longitudinal axis x of the apparatus. In some embodiments, at least two of the one or more cleaning elements rotate about the shaft in opposite, counter-rotating directions. In some embodiments, the apparatus may travel within the conduit in either a forward or backward direction relative to a longitudinal axis x of the apparatus.

In some embodiments, the methods may include providing at least one first and second end disks positioned on the shaft for frictionally contacting the sidewall of the conduit. In some embodiments, the at least one first and second end disks are positioned at the first and the second end of the shaft, respectively.

In some embodiments, the methods may include providing any number of brushing elements positioned along the shaft in between the first and second end disks and/or the one or more cleaning elements.

In some embodiments, the methods may include providing any number of spacing elements positioned along the shaft in between the first and second end disks, the one or more cleaning elements, and/or the any number of brushing elements.

The above-mentioned and other features of the present apparatus and methodology will be best understood by reference to the following description of embodiments.

BRIEF DESCRIPTION OF THE DRAWINGS

Embodiments of the present apparatus and methodologies of use will now be described by way of an example embodiment with reference to the accompanied simplified, diagrammatic, not-to-scale drawings 1-13. In the drawings.

DETAILED DESCRIPTION

The following description of embodiments is presented for purposes of illustration and description and is not intended to limit the scope of the embodiments to the forms disclosed herein. Consequently, variations and modifications commensurate with the following teachings, and skill and knowledge of the relevant art, are within the scope of the presented embodiments. The various embodiments described herein are further intended to explain the best modes known of practicing the apparatus and to enable others skilled in the art to utilize the apparatus in such or other embodiments and with various modifications required by the particular application(s) or use(s) of the presented embodiments. Reference will now be made to the accompanying FIGS. 1-13, which assist in illustrating various pertinent features of the present apparatus and methodologies of use.

Figure 2A:
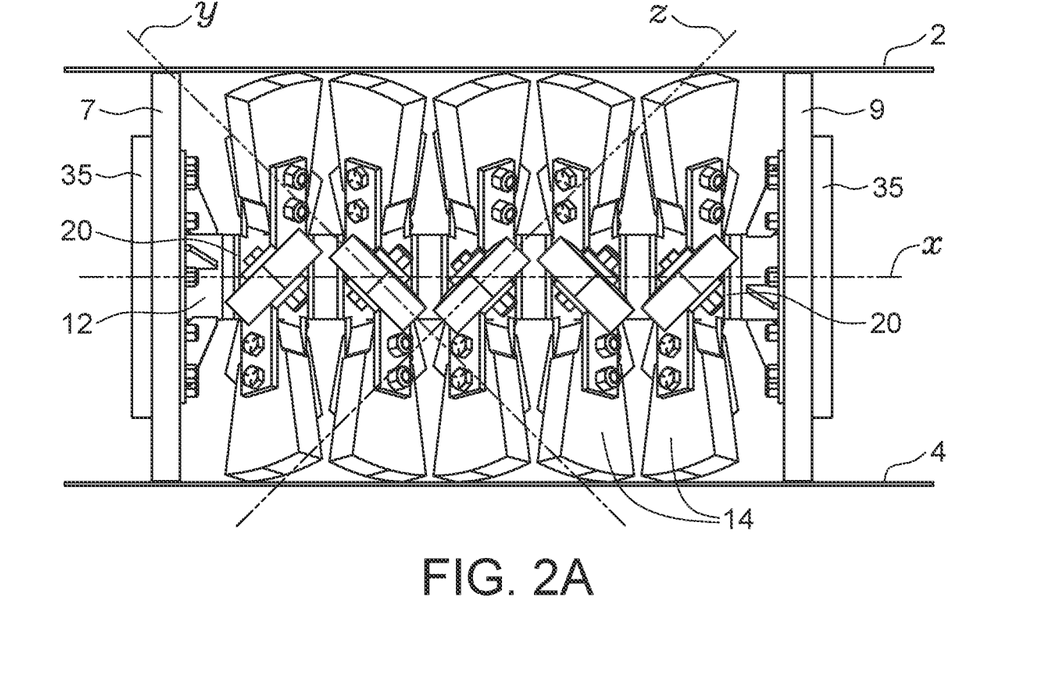
FIG. 2A is a side view of the apparatus shown in FIG. 1, the apparatus positioned within the central bore of a fluid-carrying conduit, according to embodiments.

According to embodiments, an improved apparatus 10 and methodologies of use for cleaning debris and contaminants from fluid-carrying conduits are provided. Broadly, the present apparatus 10 may be configured for insertion or 'launch' into any fluid-carrying conduit 2, the conduit 2 being a tubular having an inner bore forming a generally circular cross-sectional sidewall 4 (e.g., see FIG. 2). The present apparatus serves to provide a simple, cost-effective tool having counter-rotating cleaning elements for enhanced removal of contaminants and debris from the sidewall 4 of the conduit 2. For illustrative purposes, the present apparatus 10 will be described for use in cleaning a fluid-carrying pipeline in the oil and gas industry, however any applicable methods of use of the present apparatus 10 in any suitable fluid-carrying conduit 2 known in the art are contemplated.

Figure 1:
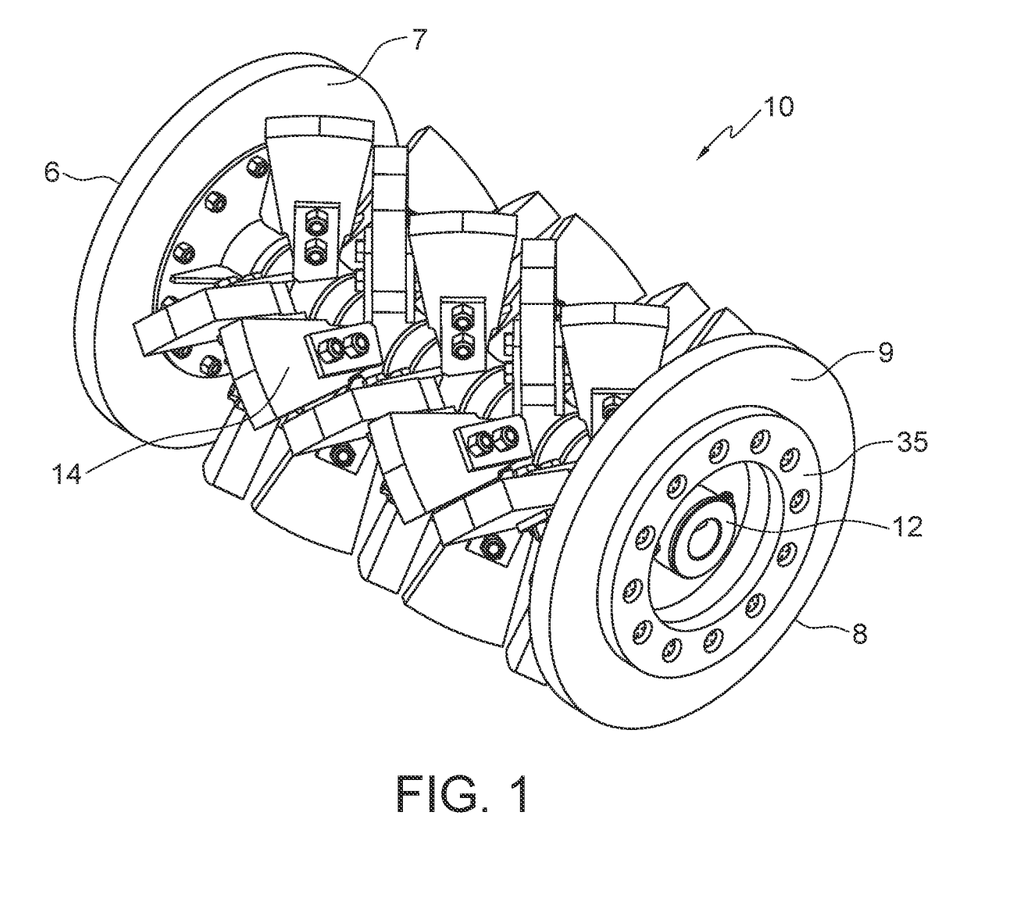
FIG. 1 is a perspective view of an apparatus according to embodiments herein.

Having regard to FIG. 1, the present apparatus 10 may comprise a centrally disposed shaft 12, each of the apparatus 10 and shaft 12 extending between a first terminal end 6 and a second terminal end 8, and along a longitudinal axis x (e.g., see FIG. 2A). Shaft 12 may comprise a tubular configuration and be manufactured from any appropriate resilient
material, such as carbon steel, stainless steel, brass, copper, or rigid polymers, or other such materials of sufficient strength to withstand the harsh pipeline environment.

Figure 4:
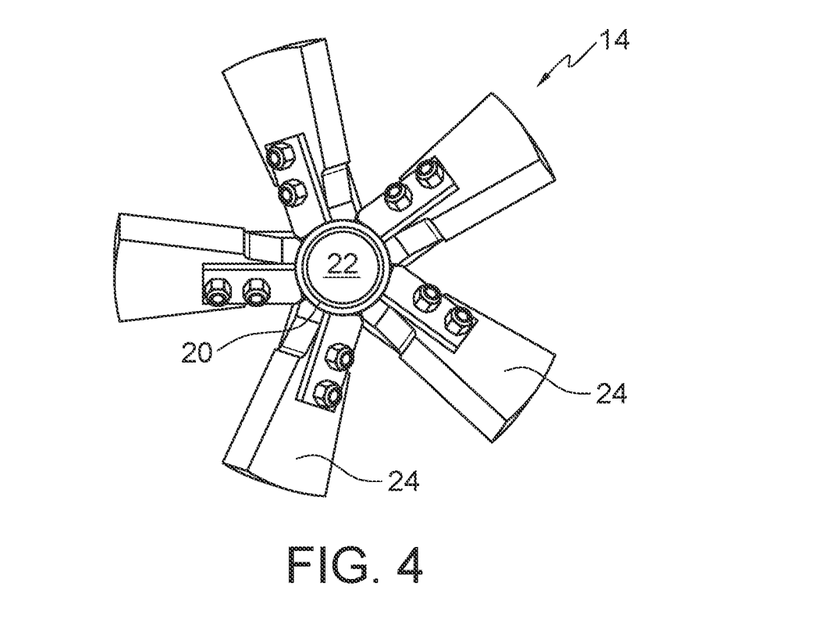
FIG. 4 is a front view of a first rotational element shown in isolation, the element arranged for rotation in a first direction (e.g., for rotation in a counter-clockwise direction) according to embodiments.

In some embodiments, shaft 12 may be configured to receive one more cleaning elements or 'propellers' 14 slidably mounted onto shaft 12, the elements 14 serving to contact and clean the sidewall 4 of the conduit 2 as the apparatus 10 moves through the conduit 2. Cleaning elements 14 may form a centrally disposed aperture 22 (e.g., see FIG. 4) for slidably receiving either first or second end 6,8 of shaft 12 therethrough. For example, during assembly, each one or more cleaning element 14 may be mounted in series onto shaft 12 by sliding first or second terminal end 6,8 of shaft through each the central aperture 22 of each cleaning element 14, and then positioning each element 14 in place longitudinally along the shaft 12.

Shaft 12 may be configured to receive at least one first end disk 7 and at least one second end disk 9, the ends disks 7,9 mounted onto shaft 12 at or near terminal ends 6,8, respectively. As will be described, cleaning elements 14 may be positioned along shaft 12 between terminal ends 6,8 and secured onto shaft 12 by end disks 7,9.

Figure 5:
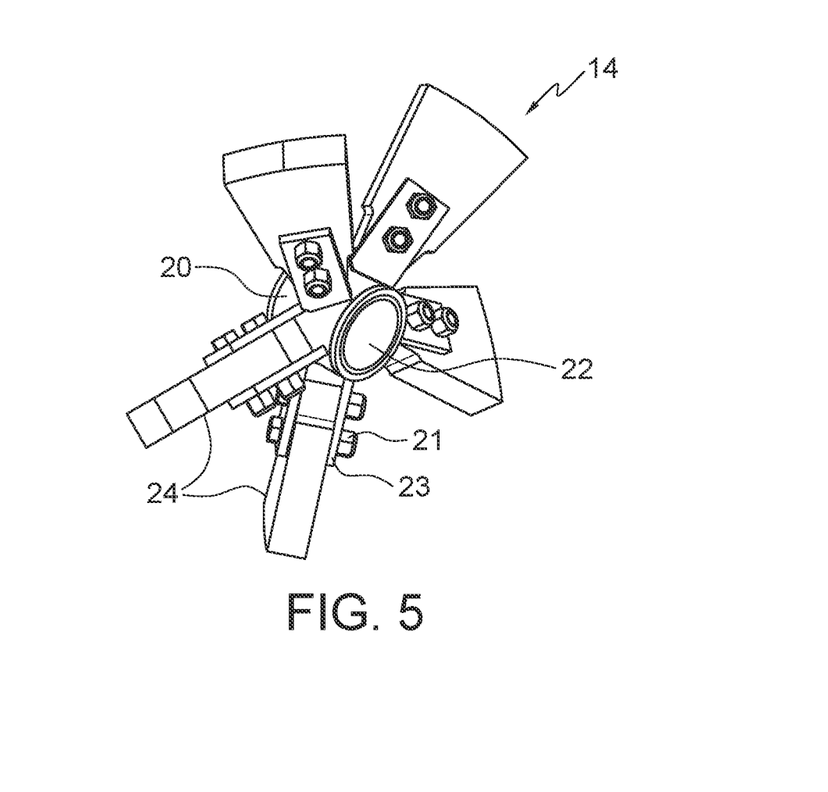
FIG. 5 is a perspective view of the rotational element shown in FIG. 4, according to embodiments.
Figure 6:
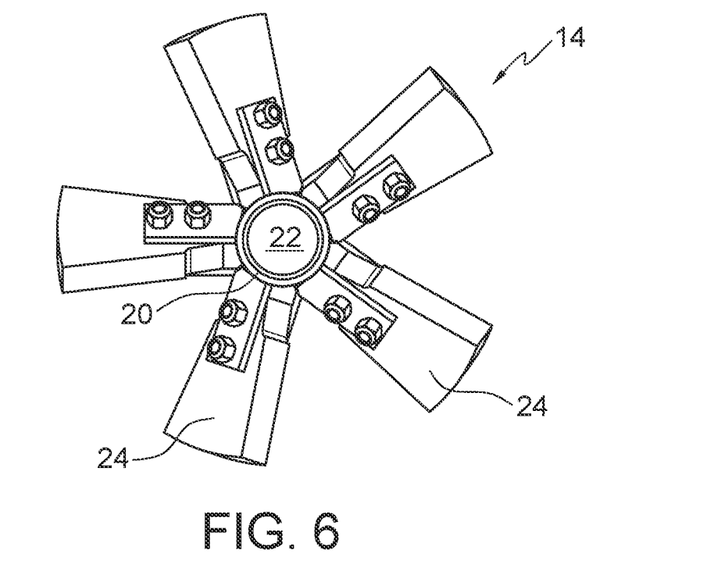
FIG. 6 is a front view of a second rotational element shown in isolation, the element arranged for rotation in a second direction (e.g., for rotation in a clockwise direction), according to embodiments.
Figure 7:
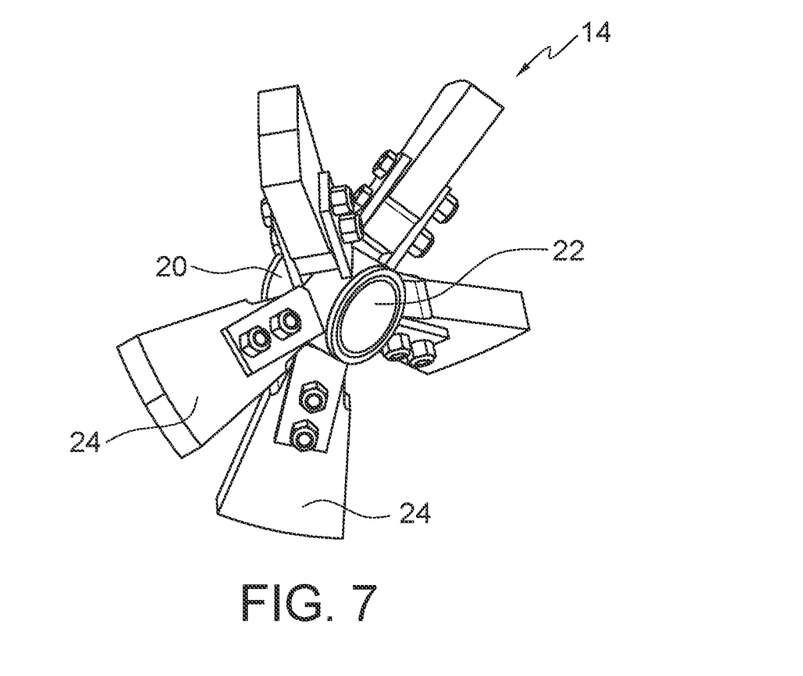
FIG. 7 is a perspective view of the second rotational element shown in FIG. 6, according to embodiments.

Having regard to FIG. 2A, cleaning elements 14 are rotatably positioned about shaft 12, i.e., each one or more cleaning element 14 may freely rotate thereabout. In some embodiments, each one or more cleaning element 14 may comprise a central hub 20 rotatable about shaft 12. Hub 20 may form aperture 22 therethrough (e.g., see FIGS. 5 and 7) and may further be configured to support at least one blade 24 mounted thereto and extending radially therefrom.

Figure 2B:
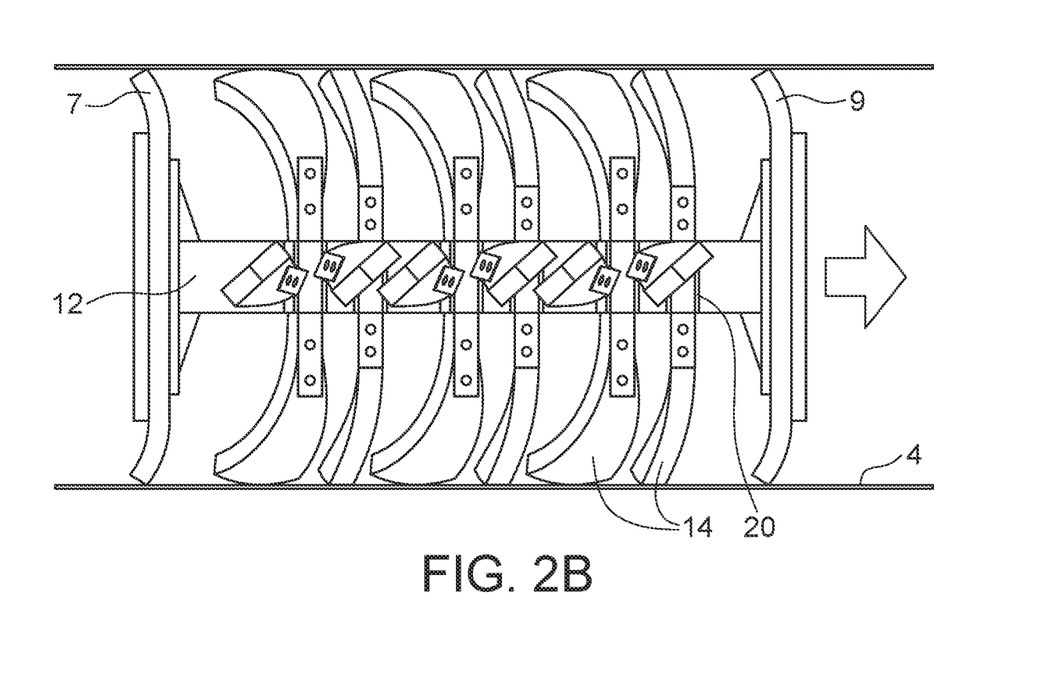
FIG. 2B is a side view of the apparatus shown in FIG. 2A, the apparatus being shown in motion within the central bore the fluid-carrying conduit, according to embodiments.

Having regard to FIG. 2B, blades 24 may be manufactured from a malleable, resistant, and resilient material, and configured such that, at a distal end, each blade 24 frictionally engages or contacts the inner sidewall 4 of conduit 2. As apparatus 10 moves through conduit 2 (see arrow to denote direction of travel), blades 24 may flex or deform in shape in response to the frictional drag along sidewall 4. In some embodiments, blades 24 may be manufactured from any malleable, resistant, and resilient material capable of resisting damage caused by scraping against sidewall 4, as well as damage caused by temperature, pressure, chemical, and electrical conditions within the conduit 2. Such materials may include wear-resistant polyurethane, as may be commercially available (e.g., Apache Pipeline Products, Canada).

In some embodiments, having regard to FIGS. 4-7, hub 20 may support a plurality of blades 24, and preferably at least five blades 24. Blades 24 may be manufactured to be integral with hub 20, or blades 24 may be distinct elements securely connected thereto. Where blades 24 are distinct elements, at least a portion of a proximal or 'root' end of each blade 24 may be secured to hub 20 using any appropriate mechanical connection means, such as by one or more nuts 21 bolted through bolt plates 23 (e.g., see FIGS. 5 and 7, where bolt plates 23 may comprise two opposed flanges welded to hub 20).

In some embodiments, as above, blades 24 may be configured such that a distal or 'tip' end of each blade 24 contacts the inner surface of sidewall 4 of conduit 2. In some embodiments, the distal tip of each blade 24 may have a width that is greater than the depth of the distal tip. In such embodiments, the distal tip may be shaped (e.g., rounded or curved) across its width to generally conform to the curvature of sidewall 4 and maximize the frictional contact therebetween. As should be appreciated, such contact between each blade 24 and sidewall 4 serves to agitate, dislodge, and clean debris within conduit 2. Moreover, as will be described, such contact between each blade 24 and sidewall 4 serves to cause rotation of each cleaning element 14 and hub 20 about shaft 12, such rotation advantageously being in either clockwise or counter-clockwise direction. For example, having further regard to FIG. 2A, the at least one blades 24 may be specifically orientated or angled relative to the longitudinal axis x to impart rotation of element 14 about shaft 12 as apparatus travels through conduit 2. That is, as apparatus 10 moves either a forward or backward direction within the conduit 2, the at least one blades 24 contact the sidewall 4 of the conduit 2 and, because of the specific orientation of each distal end relative to the sidewall and the frictional force applied thereto, cause the entire element 14 (via hub 20) to rotate about shaft 12 in either a clockwise or counter clockwise direction.

For example, in some embodiments, some of the at least one blade 24 may be mounted substantially perpendicularly onto hub 20, extending radially therefrom, and at a first pitched angle with respect to the longitudinal axis x of the apparatus 10 (e.g., depicted as z, see FIG. 2A). In this example, each blade 24 may be faced such that contact of the distal tip of blade 24 with sidewall 4 imparts rotation of the blade 24 in a clockwise direction about the shaft 12 (i.e., about longitudinal axis x when viewed from first terminal end 6). As would be appreciated, the direction of rotation may be determined by the vector sum, or resultant, of forces applied to the face of each blade 24, namely drag forces caused by the friction between the distal tip of blade 24 and sidewall 4 and resisting forces caused by the internal structure of blade 24. Drag forces oppose the movement of apparatus 10 through conduit 2 and are parallel to longitudinal axis x (i.e., vectored right to left). Resisting forces oppose deflection of blade 24 and are perpendicular to pitched angle (i.e., vectored top left to bottom right), and the resultant drag forces and resisting forces cause blade 24 to rotate (i.e., vectored top to bottom). It is contemplated that the at least one blade 24 may be positioned on hub 20 at any angle appropriate to cause rotation of hub 20 (i.e., any blade twist relative to the longitudinal axis x) or, for example, such that the pitch angle of the at least one blade 24 ranges from approximately 1°-90°, and preferably about 45° (e.g., depicted as axis z).

Alternatively, in some embodiments, some of the at least one blade 24 may be mounted substantially perpendicularly onto hub 20, extending radially therefrom, and at a second pitched angle with respect to the longitudinal axis x of the apparatus (e.g., depicted as y, see FIG. 2A). In this example, each blade 24 may be faced such that contact of the distal tip of blade 24 with sidewall 4 imparts rotation of the blades 24 in a counter clockwise direction about the shaft 12 (i.e., or a direction opposite axis z described above about longitudinal axis x when viewed from first terminal end 6). It is contemplated that the at least one blade 24 may be positioned on hub 20 at any angle appropriate to cause rotation of hub 20 (i.e., any blade twist relative to the longitudinal axis x) or, for example, such that the pitch angle of the at least one blade 24 ranges from approximately 91°-180°, and preferably 135° (e.g., depicted as axis y).

In operation, having regard to FIG. 2B, as the apparatus 10 travels through conduit 2 in either forward or backwards direction along longitudinal axis x, at least one blade 24 frictionally contacts and scrapes along sidewall 4, causing rotational movement of blades 24 (and correspondingly element 14) about shaft 12. In combination, each of the frictional engagement of the blades 24 with the sidewall 4 and the rotation of elements 14 and blades 24 serve as a mechanical propeller about central hub 20 for enhanced cleaning of conduit 2.

As would be appreciated, blades 24 may be sized, shaped, and orientated so as to trace opposed helical spirals along sidewall 4 of conduit 2 as apparatus 10 moves through conduit 2 (e.g., akin to continuous bi-directional screws) capable of achieving an enhanced contra-rotational cleaning effect, reducing the overall number of passes needed and minimizing both the time and the cost to effectively clean the conduit 2. Moreover, the enhanced contra-rotational cleaning effect also eliminates the need for the entire apparatus 10 to rotate, which may be advantageous if, for example, apparatus 10 is connected to external componentry (described below).

Figure 3:
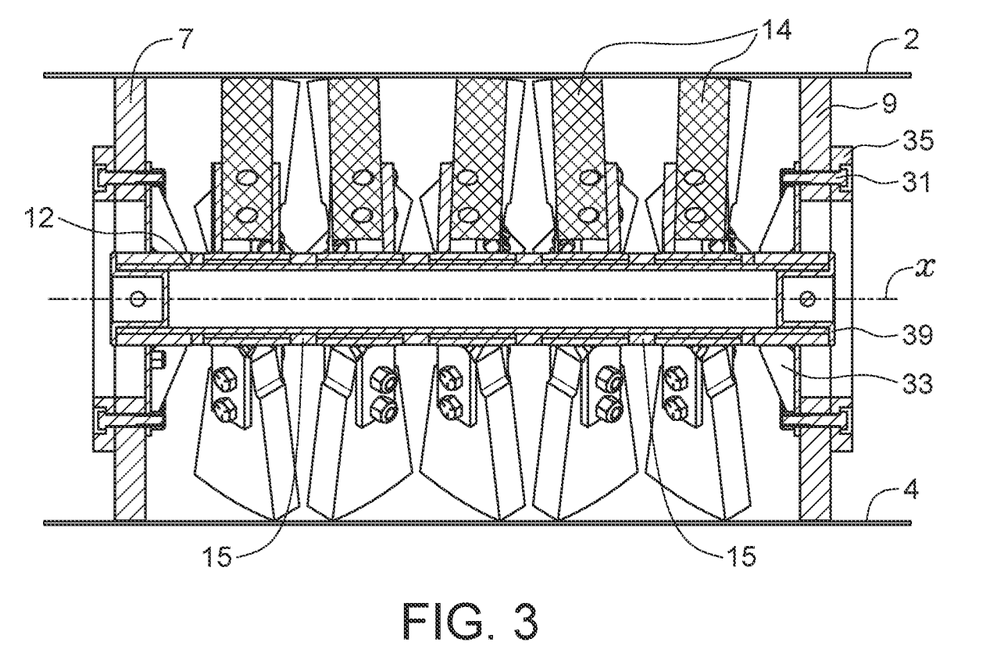
FIG. 3 is cross-sectional side view of the apparatus shown in FIG. 1, according to embodiments.

Having regard to FIG. 3, in some embodiments, at least one tubular spacing element 15 may be used to maintain a predetermined distance between cleaning elements 14 along shaft 12. Spacing elements 15 may be any size and configuration as desired, and may be manufactured to withstand the potentially harsh environment within conduit 2 including from carbon steel, stainless steel, copper, rigid polymers, and preferably brass, or the like.

In some embodiments, spacing elements 15 may be substantially cylindrical in shape such that spacing elements 15 may be slidably mounted on to shaft 12 during assembly, as desired. As would be appreciated, each one or more spacing element 15 serves to maintain a pre-determined distance between cleaning elements 14 along shaft 12, to provide bearings between each element 14, and to maintain a pre-determined distance between elements 14 and at least one brushing element 16 along shaft 12 (described below). For example, when an optional brushing element 16 is used, at least one spacing element 15 may be slidably mounted onto shaft 12 in between each cleaning element 14 and the one or more brushing elements 16.

As above, in some embodiments, apparatus 10 comprises a shaft 12 having first and second terminal ends 6,8, for mounting first and second end disks 7,9, respectively. Returning to FIG. 3, each end disk, 7,9 may be sized and shaped to generally correspond with or exceed the inner diameter of sidewall 4, such that disks 7,9 sealingly engage therewith as the apparatus 10 moves through the conduit 2. In this regard, disks 7,9 encompass the entire diameter of the conduit 2, providing a surface for receiving hydraulic pressures generated by fluids flowing through conduit 2, such pressures acting upon disks 7,9 to actuate apparatus 10 through conduit 2. Advantageously, fluid pressures may be imposed on either disk 7,9 to move apparatus in either a forward or backwards direction through conduit 2.

In some embodiments, each end disk 7,9 may be substantially circular in cross section and may form a centrally disposed aperture for slidably receiving shaft 12 therethrough. For example, during assembly, each end disk 7,9 may be mounted onto shaft 12 by sliding first or second terminal end 6,8, respectively, through each disk 7,9 and then positioning each disk 7,9 in place longitudinally along shaft 12. Advantageously, where desired, one or both disks 7,9 may be easily removed from apparatus 10 for maintenance, cleaning, and replacement, or to accommodate different conduits 2 of varying sizes and/or fluid capacities.

In some embodiments, disks 7,9 may be configured such that the circumference of each disk 7,9 frictionally engages with or contacts the inner surface of sidewall 4. Disks 7,9 may comprise an outer diameter that is equal to or greater than the interior diameter of the conduit 2. Disks 7,9 may be manufactured from flexible or malleable material so as to permit insertion of apparatus 10 into conduit 2 notwithstanding that disks 7,9 may comprise a slightly greater outer diameter relative to the inner diameter of the conduit 2. Disks 7,9, may serve to stabilize and/or centralize apparatus 10 within conduit 2 and may provide further cleaning elements for additional cleaning without inhibiting travel of the apparatus 10 though conduit 2. By way of example, disks 7,9 may have an outer diameter approximately 0", ¼", ½", or ¾" greater than the interior diameter of the conduit 2, or otherwise desired and based on the internal diameter of conduit 2.

In some embodiments, disks 7,9 may be manufactured from any malleable and resilient material capable of resisting damage caused by scraping against sidewall 4, as well as damage caused by temperature, pressure, chemical, and electrical conditions within the conduit 2. Disks 7,9 may also be formed of any material that is suitable for sealingly engaging with sidewall 4 and further capable to withstand fluid pressures within conduit 2. In this regard, disks 7,9 are operative to receive and respond to fluid pressure transmitted thereto in order to move apparatus 10 within conduit 2. Such materials may include wear-resistant polyurethane, as may be commercially available (e.g., Apache Pipeline Products, Canada).

As would be appreciated, the additional frictional contact between disks 7,9 and sidewall 4 enhances the agitation of the debris and contaminants within conduit 2, compounding the cleaning effect provided by blades 24 and optimizing apparatus efficiency.

Figure 8:
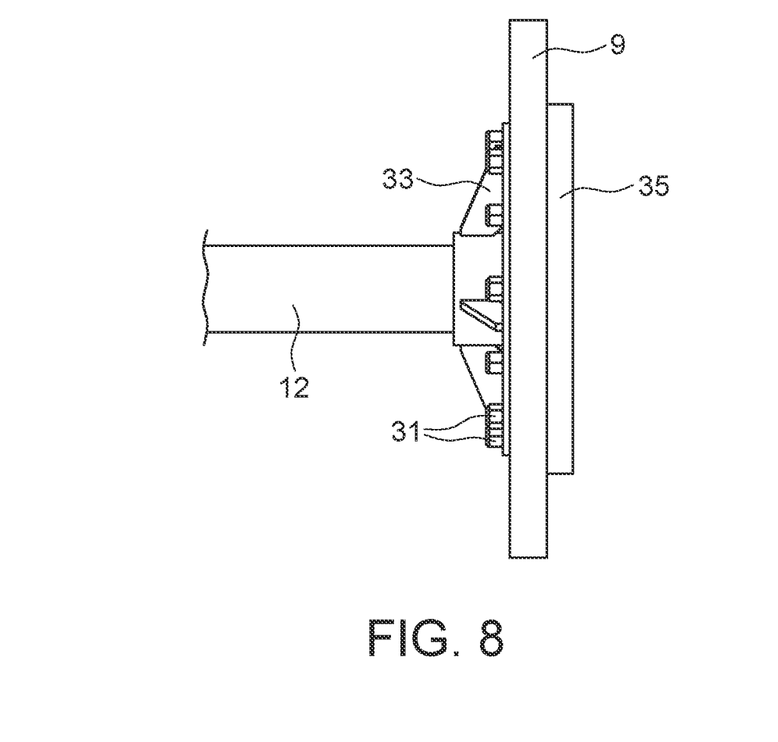
FIG. 8 shows an isolated side view of a connection means, the connection means for securing at least one end disk to the present apparatus, according to embodiments.

In some embodiments, disks 7,9 may be releasably secured onto shaft 12 by one or more mechanical connection means, said connection means being any suitable means known in the art. For example, having regard to FIG. 8 (only end disk 9 is shown for illustration purposes), end disk 9 may form at least one bolt hole for receiving one or more nuts 31 bolted through opposed, corresponding bolt plates 33,35.

Figure 9A:
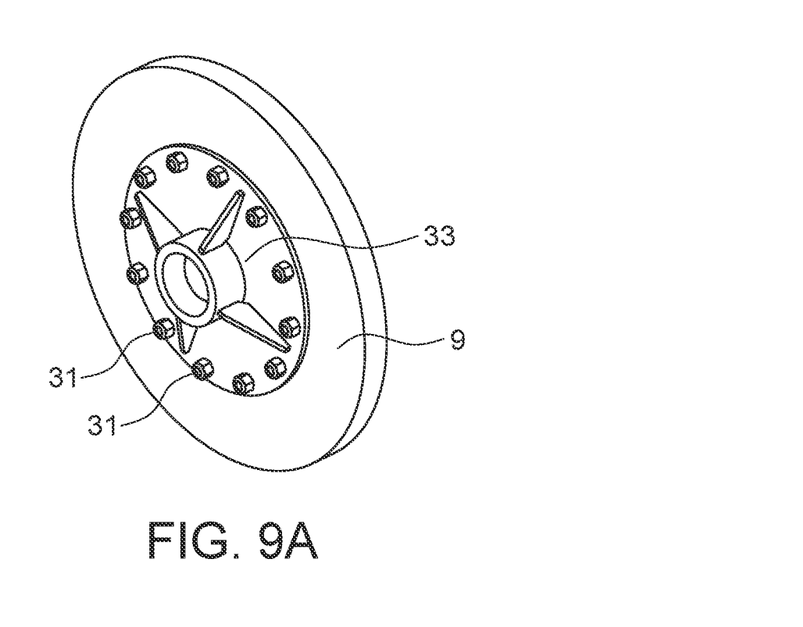
FIG. 9A shows an inner perspective view of the connection means shown in FIG. 8, according to embodiments.
Figure 9B:
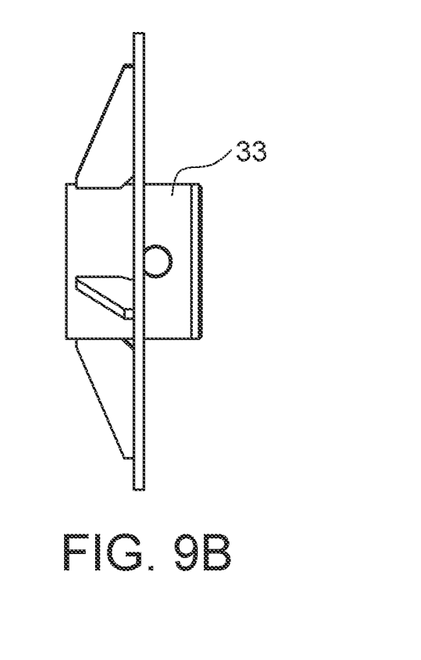
FIG. 9B shows a side view of an inner bolt plate of the connection means shown in FIG. 8 and an end cap positioned relative thereto, according to embodiments.
Figure 9C:
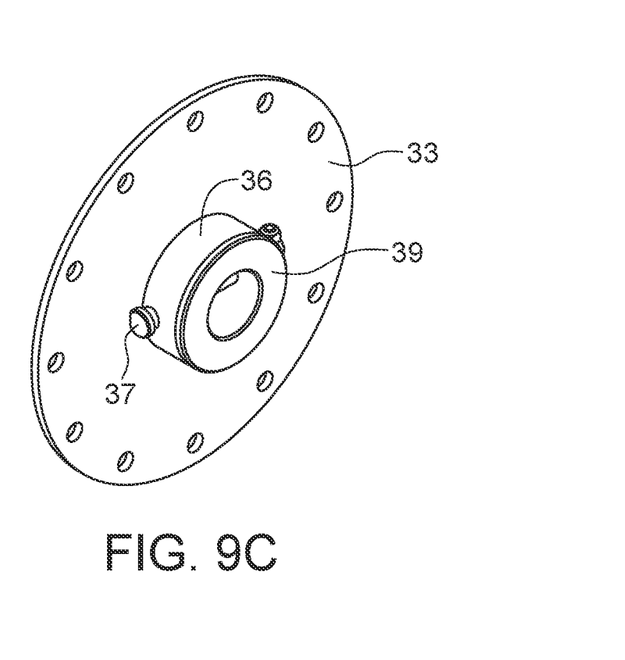
FIG. 9C shows an outer perspective view of the inner bolt plate shown in FIG. 9B, according to embodiments.
Figure 10A:
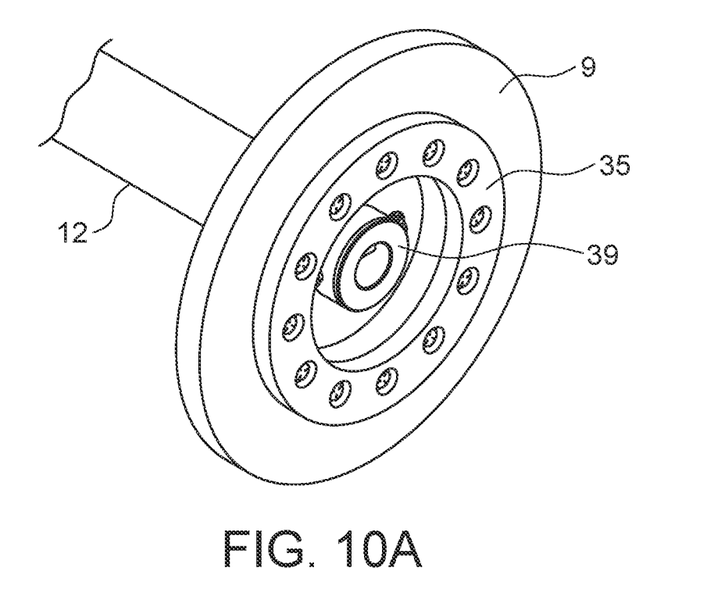
FIG. 10A shows an outer perspective view of the connection means shown in FIG. 8, according to embodiments.
Figure 10B:
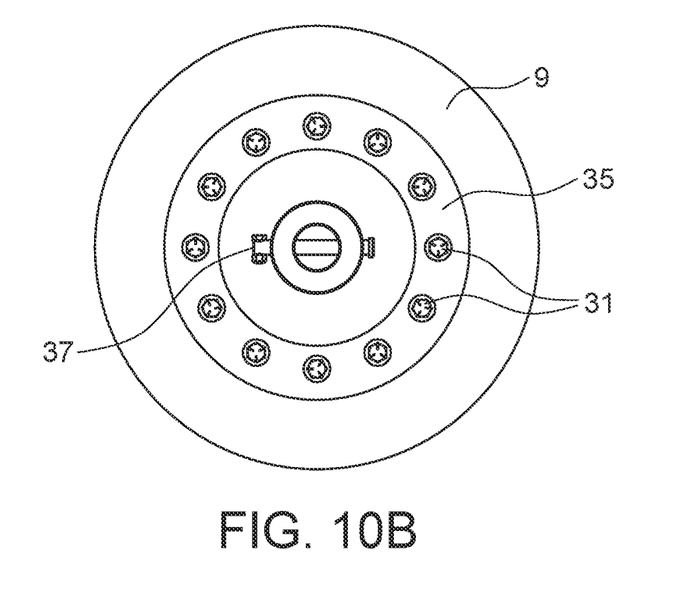
FIG. 10B shows a front view of the connection means shown in FIG. 8, according to embodiments.

More specifically, corresponding bolt plates may comprise an inner or interior bolt plate 33 for receiving at least one end disk 9 mounted thereon (FIGS. 9A-9C, only end disk 9 shown for illustration purposes) and an outer or exterior bolt plate 35 (FIGS. 10A-10B, only disk 9 shown for illustration purposes). During assembly, inner plate 33 may be slidably mounted onto shaft 12 first followed by outer bolt plate 35, the plates 33,35 sandwiching disk 9 securely therebetween. In some embodiments, bolt plates 33,35 may be manufactured from carbon steel, stainless steel, brass, copper, or rigid polymers. Advantageously, exterior bolt plates 35 may also serve as 'bumpers' or 'stops', preventing damage to apparatus 10 where it may inadvertently contact componentry or other obstructions within conduit 2 (e.g., valves, elbows, joints, or the like).

Bolt plate 33 may be releasably connected to shaft 12 for ease of assembly and disassembly. It should be appreciated that any suitable means for releasably securing end disks 7,9 onto shaft 12 are contemplated, and that the presently described connection means are only provided as one example. For example, bolt plate 33 may be secured to shaft 12 via at least one quick-release mechanism, or such other applicable securing means as known in the art.

For example, in some embodiments, inner bolt plate 33 may form at least one centrally disposed cylindrical portion 36 extending therefrom, said portion 36 forming corresponding pin holes for receiving quick-release pin 37 (e.g., see FIG. 9C). In this regard, pin 37 may be easily inserted through bolt plate 33 and shaft 12 during assembly, and then removed therefrom during disassembly of apparatus 10.

Figure 10C:
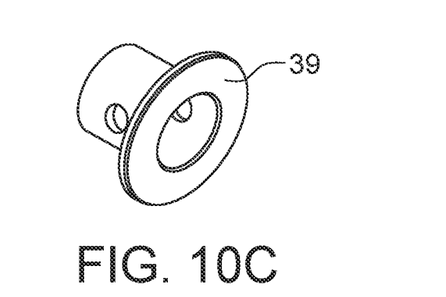
FIG. 10C shows a perspective view of the end cap shown in FIG. 9B, according to embodiments.

Having regard to FIG. 10C, connection means may further comprise an end cap 39 slidingly received within central bore of shaft 12, the end cap 39 also comprising pin holes for receiving quick-release pin 37 and for sealingly off the bore of shaft 12. In some embodiments, end cap 39 may comprise an outer flange with a diameter that is approximately equal to the outer diameter of cylindrical portion 36 of inner bolt plate 33 and/or the outer diameter of shaft 12 of apparatus 10. In some embodiments, end cap 39 may be manufactured from carbon steel, stainless steel, brass, copper, or rigid polymers.

Figure 11A:
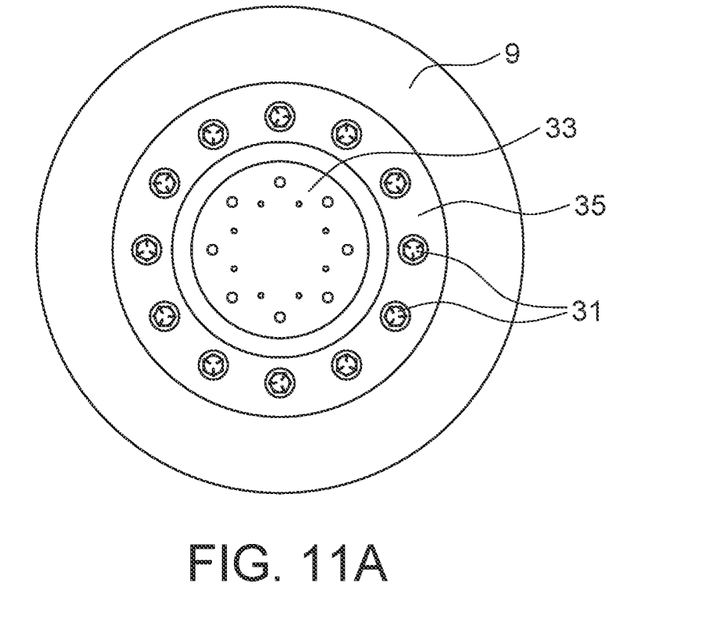
FIG. 11A shows a front view of an alternative connection means and end cap, according to embodiments.
Figure 11B:
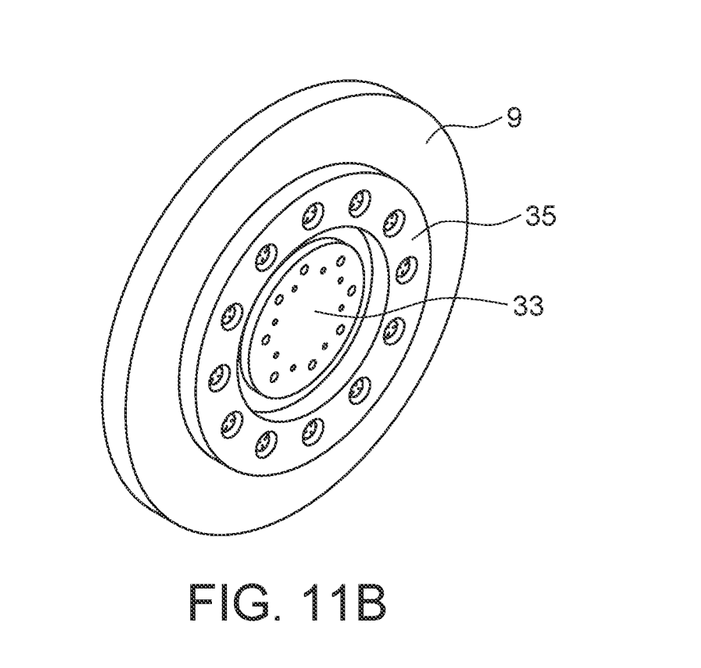
FIG. 11B shows an outer perspective view of the alternative connection means shown in FIG. 11A, according to embodiments.
Figure 11C:
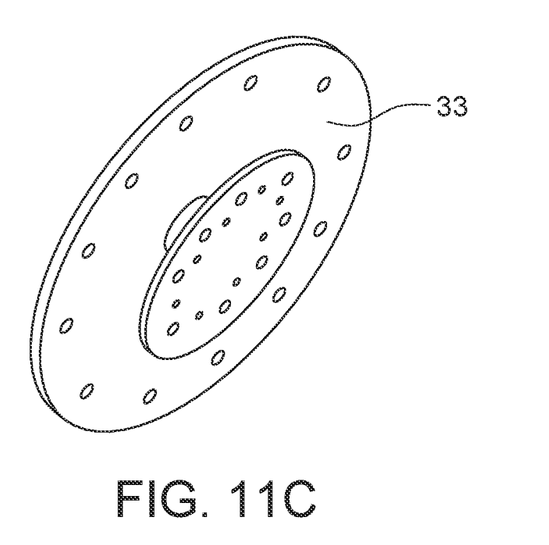
FIG. 11C shows an outer perspective view of the alternative end cap shown in FIG. 11A, positioned relative to the inner bolt plate shown in FIG. 9C, according to embodiments.
Figure 11D:
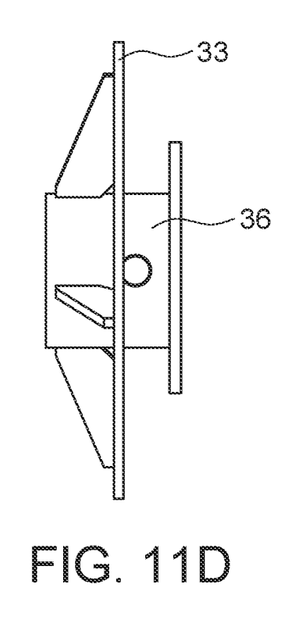
FIG. 11D shows a side view of the alternative end cap shown in FIG. 11A, positioned relative to the inner bolt plate shown in FIG. 9C, according to embodiments.
Figure 11E:
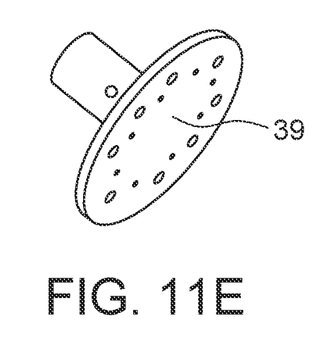
FIG. 11E shows the alternative end cap shown in FIG. 11A, according to embodiments.

Having regard to FIGS. 11A-11C, end cap 39 may comprise an outer flange with a diameter that is greater than the diameter cylindrical portion 36 of inner bolt plate 33 and/or the outer diameter of shaft 12 of apparatus 10. In such embodiments, the outer flange of end cap 39 may comprise a connection means for connecting apparatus 10 to external componentry within conduit 2 (not shown), such as apparatus location transmitters and the like. For example, the connection means may include bolt holes to receive bolts extending from external componentry. Advantageously, the bolt holes may correspond with various bolt configurations that are standard in the industry, allowing for convenient connection of apparatus 10 to external componentry. It will be appreciated that other connection means are known.

Figure 12:
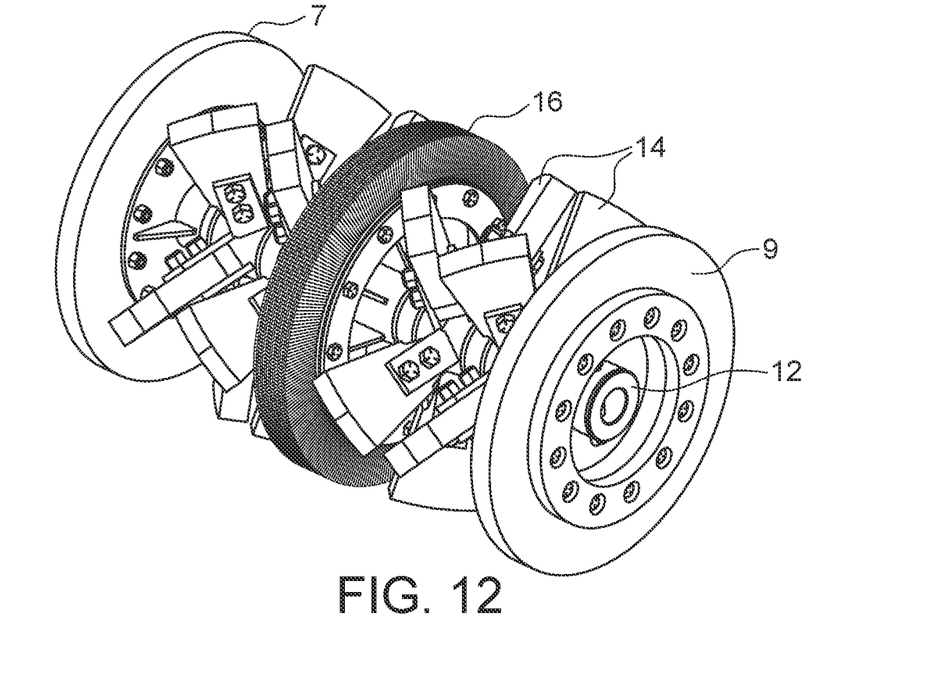
FIG. 12 is a perspective view of an alternative embodiment of the apparatus shown in FIG. 1 according to embodiments, the alternative embodiment of the apparatus comprising a brushing element, according to embodiments.
Figure 13:
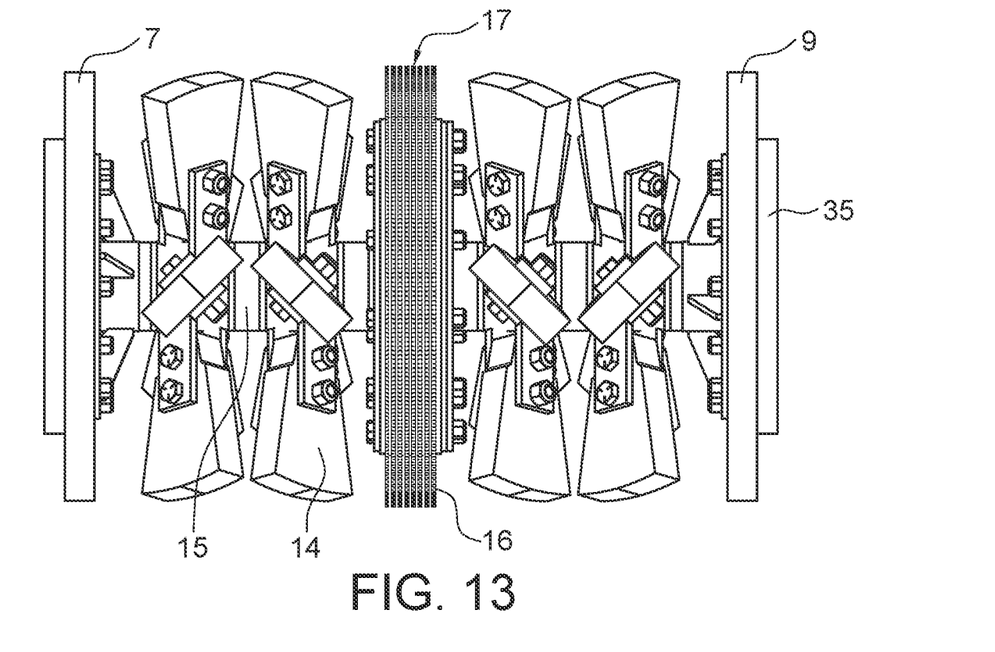
FIG. 13 is an isometric side view of the alternative embodiment of the apparatus shown in FIG. 12, according to embodiments.

Having regard to FIGS. 12 and 13, in some embodiments, apparatus 10 may optionally comprise at least one brushing element 16 positioned along shaft 12 in between first and second end disks 7,9 for further enhancing cleaning of conduit 2. In some embodiments, brushing element 16 may form a centrally disposed aperture for receiving either first or second end 6,8 of shaft 12 therethrough, and such that brushing element 16 may freely rotate about shaft 12 relative to axis x or, alternatively, be fixed in position on shaft 12. Brushing element 16 may be positioned along shaft 12 such that one or more cleaning elements 14 are positioned between brushing element 16 and each first and second end disk 7,9. Without limitation, in some embodiments, brushing element 16 may be centrally disposed along shaft 12, encircling shaft 12 in between end disks 7,9. Brushing element 16 may be manufactured to withstand the potentially harsh environment within conduit 2 such as carbon steel, stainless steel, brass, copper, rigid polymers, or the like (e.g. Apache Pipeline Products, Canada).

As shown in FIG. 12, the at least one brushing element 16 may comprise a plurality of rigid bristles 17. Bristles 17 may be radially disposed about brushing element 16 and of sufficient length such that, as apparatus 10 moves through conduit 2, bristles 17 frictionally engage with or contact inner sidewall 4 of conduit 2, scraping the debris and contaminants therefrom. Bristles 17 may be manufactured to as to provide approximately 3600 contact with the inner sidewall 4. Bristles 17 may be manufactured to withstand the potentially harsh environment within conduit 2, such tempered steel wires (Apache Pipeline Products, Canada). As above, it is contemplated that end disks 7,9, brushing element 16, and/or bristles 17 may be manufactured using any appropriate corrosion-resistant materials known in the art.

During pipeline 'pigging' operations, the present apparatus 10 for cleaning an inner sidewall 4 of a fluid-carrying conduit 2 may first be inserted into the conduit 2 and positioned such that either first or second terminal end 6,8 faces the direction of fluid flow and/or movement of the apparatus 10 through the conduit 2. That is, apparatus 10 may be capable of traveling bi-directionally, or operative in either a forward or backwards direction, within the conduit 2, regardless of the direction of fluid flow or movement of the apparatus 10 along the longitudinal axis x.

Once in position, hydraulic pressures from fluids pumping through conduit 2 act upon end disk 7,9 to impart axial movement of apparatus 10 along the conduit 2. As apparatus 10 travels through conduit 2, at least one blade 24 from the one or more cleaning elements 14 frictionally engages sidewall 4, scraping the wall and removing debris therefrom. As above, due to the specific positioning of blades 24, movement of apparatus 10 along conduit 2 causes rotation of the one or more cleaning elements 14, said rotation being in either the clockwise or counter-clockwise direction depending upon the orientation of blades 24.

Advantageously, as apparatus 10 travels through conduit, end disks 7,9 also make scraping contact with the inner sidewall 4 of conduit, enhancing the cleaning of debris therefrom. Optionally, where desired, bristles 17 of brushing element 16 can also be used to further enhance cleaning. When 'pigging' operations are complete, apparatus 10 may be retrieved and removed from conduit 2.

More specifically, according to embodiments, methods of cleaning an inner sidewall of a fluid-carrying conduit are provided. In some embodiments, the method comprises provided an apparatus for cleaning the sidewall, positioning or 'launching' the apparatus within the conduit at a first position, allowing hydraulic pressures from fluid flowing through the conduit the conduit to impart axial forces on the apparatus to move the apparatus to a second position within the conduit, wherein movement of the apparatus causes one or more cleaning elements of the apparatus to frictionally engage with the sidewall to clean the sidewall.

In some embodiments, the apparatus for use in cleaning the inner sidewall may comprise a tubular shaft 12, having a first end and a second end 7,8, one or more cleaning elements 14, each cleaning element 14 rotatably mounted onto the shaft 12 between the first and second end 6,8, and each cleaning element 14 having at least one blade 24 extending radially therefrom for frictionally contacting the sidewall 4 of the conduit 2.

The previous description of the embodiments disclosed herein is provided to enable any person skilled in the art to make or use the presently disclosed invention. Various modifications to those embodiments will be readily apparent to those skilled in the art, and the generic principles defined herein may be applied to other embodiments without departing from the scope of the claims. Thus, the presently disclosed invention is not intended to be limited to the embodiments disclosed herein, but is to be accorded the full scope consistent with the claims, wherein reference to an element in the singular, such as by use of the articles "a" or "an" is not intended to mean "one and only one" unless specifically so stated, but rather is intended to mean "one or more." All structural and functional equivalents to the elements of the embodiments disclosed herein that are known or later come to be known to those of ordinary skill in the art are intended to be encompassed by the elements of the claims. Moreover, nothing disclosed herein is intended to be dedicated to the public regardless of whether such disclosure is explicitly recited in the claims.

I claim:

1. An apparatus for cleaning an inner sidewall of a fluid-carrying conduit, the apparatus comprising:
    a tubular shaft, having a first end and a second end, the first end of the tubular shaft having at least one first end disk and the second end of the tubular shaft having at least one second end disk;
    at least two cleaning elements, the at least two cleaning elements forming a centrally disposed hub for rotatably mounting the at least two cleaning elements onto the shaft between the first and second end disks, the hub of each of the at least two cleaning elements having
    at least one blade extending radially from the hub and mounted perpendicularly onto the hub at an angled orientation from a longitudinal axis x of the apparatus for frictionally contacting the inner sidewall of the conduit, such contact causing rotation of the at least two cleaning elements in a clockwise or a counterclockwise direction relative to the longitudinal axis x of the apparatus, and in opposite, counter-rotating directions relative to one another, as the apparatus traverses through the conduit bidirectionally along the longitudinal axis x.

2. The apparatus of claim 1, wherein the at least one blade of a first of the at least two cleaning elements is angled at about 45° from the axis x and the at least one blade of a second of the at least two cleaning elements is angled at about 1350 from the axis x.

3. The apparatus of claim 1, wherein the first and second end disks have an outer diameter about greater than the inner diameter of the sidewall of the conduit.

4. The apparatus of claim 3, wherein the at least two cleaning elements are positioned between the first and second end disks.

5. The apparatus of claim 4, wherein the at least two cleaning elements and the first and second end disks are releasably secured to the shaft by corresponding connection means.

6. The apparatus of claim 1, wherein the tubular shaft further comprises at least one brushing element.

7. The apparatus of claim 1, wherein the tubular shaft further comprises at least one spacing element.

8. The apparatus of claim 1, wherein the tubular shaft is configured for connection to external componentry.

9. A method of cleaning an inner sidewall of a fluid-carrying conduit, the method comprising:
    providing an apparatus for cleaning the inner sidewall into the conduit, the apparatus having
        a tubular shaft, having a first end and a second end, the first end of the tubular shaft having at least one first end disk and the second end of the tubular shaft having at least one second end disk;
        at least two cleaning elements, the at least two cleaning elements forming a centrally disposed hub for rotatably mounting the at least two cleaning elements onto the shaft between the first and second end disks, the hub of each of the at least two cleaning elements having
        at least one blade extending radially from the hub and mounted perpendicularly onto the hub at an angled orientation from a longitudinal axis x of the apparatus for frictionally contacting the inner sidewall of the conduit;
    positioning the apparatus within the conduit at a first position;
    allowing fluid flow within the conduit to impart a force on the apparatus to move the apparatus to a second position within the conduit;
    wherein movement of the apparatus bidirectionally within the conduit between the first position and the second position causes rotation of the at least two cleaning elements in a clockwise or a counterclockwise direction relative to the longitudinal axis x of the apparatus, and in opposite, counter-rotating directions relative to one another.

10. The method of claim 9, the method comprising providing at least one brushing element mounted on the shaft.

11. The method of claim 9, the method comprising providing at least one spacing element mounted on the shaft.

* * * * *